US008090806B1

(12) United States Patent
Freskos et al.

(10) Patent No.: US 8,090,806 B1
(45) Date of Patent: Jan. 3, 2012

(54) TWO-STAGE NETWORK DEVICE CONFIGURATION PROCESS

(75) Inventors: Mark A. Freskos, Morrisville, NC (US);
Michelle D. Hawke, St Albans (GB);
Dhanendra Jain, Milpitas, CA (US);
Kapil Jain, San Jose, CA (US); Charles M. Letchworth, Cary, NC (US); Neal McDonnell, Worcester (GB); Yassin Movassaghi, Raleigh, NC (US);
Sukumar Puvvala, Bangalore (IN);
Xiaobing Xie, San Jose, CA (US);
David D. Ward, Somerset, WI (US)

(73) Assignee: Cisco Technology, Inc., San Jose, CA (US)

(*) Notice: Subject to any disclaimer, the term of this patent is extended or adjusted under 35 U.S.C. 154(b) by 1283 days.

(21) Appl. No.: 10/866,647

(22) Filed: Jun. 10, 2004

(51) Int. Cl.
*G06F 15/177* (2006.01)
*G06F 15/173* (2006.01)
*G06F 9/44* (2006.01)

(52) U.S. Cl. ........ 709/221; 709/220; 709/222; 709/242; 717/170; 717/171; 717/173

(58) Field of Classification Search .................. 709/200, 709/216, 220–222, 238–246; 717/168–178; 370/351
See application file for complete search history.

(56) References Cited

U.S. PATENT DOCUMENTS

| 4,965,719 A | 10/1990 | Shoens et al. |
| 5,359,593 A | 10/1994 | Derby et al. |
| 5,394,531 A | 2/1995 | Smith |
| 5,418,966 A | 5/1995 | Madduri |
| 5,594,792 A | 1/1997 | Chouraki et al. |
| 5,832,503 A | 11/1998 | Malik et al. |
| 5,928,331 A | 7/1999 | Bushmitch |
| 5,968,176 A | 10/1999 | Nessett et al. |
| 5,970,064 A | 10/1999 | Clark et al. |
| 6,009,081 A | 12/1999 | Wheeler et al. |
| 6,021,263 A | 2/2000 | Kujoory et al. |
| 6,021,439 A | 2/2000 | Turek et al. |
| 6,028,842 A | 2/2000 | Chapman et al. |
| 6,041,350 A * | 3/2000 | Takimoto ...................... 709/223 |
| 6,046,980 A | 4/2000 | Packer |

(Continued)

OTHER PUBLICATIONS

S. Blake, et al., "An Architecture for Differentiated Services," Dec. 1998, Network Working Group, Request for Comments: 2475, pp. 1-36.

(Continued)

*Primary Examiner* — Gregory Todd
(74) *Attorney, Agent, or Firm* — Hickman Palermo Truong & Becker LLP (57) ABSTRACT

A method and apparatus for modifying the configuration of a network device, such as a router, using a two-stage configuration model is provided. A first request for a change in configuration of a network device is received. Configuration data that describes the change in configuration of the network device is stored in a buffer. A second request to modify the current operational state of the network device to reflect the configuration data stored in the buffer is received. An exclusive lock on the network device is obtained. The current operational state of the network device is modified to reflect the configuration data stored in the buffer. Multiple users may modify the network device without interfering with one another because conflicts are avoided through use of an exclusive lock. Requests of different management operations may be contained within XML documents that are transmitted from the client to the network device.

45 Claims, 3 Drawing Sheets

U.S. PATENT DOCUMENTS

| | | | |
|---|---|---|---|
| 6,047,322 | A | 4/2000 | Vaid et al. |
| 6,061,725 | A | 5/2000 | Schwaller et al. |
| 6,104,700 | A | 8/2000 | Haddock et al. |
| 6,118,760 | A | 9/2000 | Zaumen et al. |
| 6,154,776 | A | 11/2000 | Martin |
| 6,154,878 | A | 11/2000 | Saboff |
| 6,167,445 | A | 12/2000 | Gai et al. |
| 6,169,748 | B1 | 1/2001 | Barbas et al. |
| 6,170,009 | B1 | 1/2001 | Mandal et al. |
| 6,212,184 | B1 | 4/2001 | Venkatachary et al. |
| 6,275,935 | B1 | 8/2001 | Barlow et al. |
| 6,286,052 | B1 | 9/2001 | McCloghrie et al. |
| 6,301,253 | B1 | 10/2001 | Ichikawa |
| 6,301,613 | B1 | 10/2001 | Ahlstrom et al. |
| 6,324,184 | B1 | 11/2001 | Hou et al. |
| 6,327,618 | B1 | 12/2001 | Ahlstrom et al. |
| 6,363,429 | B1 | 3/2002 | Ketcham |
| 6,393,473 | B1 | 5/2002 | Chu |
| 6,401,240 | B1 | 6/2002 | Summers |
| 6,424,659 | B2 | 7/2002 | Viswanadham et al. |
| 6,430,154 | B1 | 8/2002 | Hunt et al. |
| 6,442,151 | B1 | 8/2002 | H'mimy et al. |
| 6,463,470 | B1 | 10/2002 | Mohaban et al. |
| 6,466,984 | B1 | 10/2002 | Naveh et al. |
| 6,473,793 | B1 | 10/2002 | Dillion et al. |
| 6,483,805 | B1 | 11/2002 | Davies et al. |
| 6,484,261 | B1 | 11/2002 | Wiegel |
| 6,490,564 | B1 | 12/2002 | Dodrill et al. |
| 6,493,804 | B1 | 12/2002 | Soltis et al. |
| 6,539,425 | B1 | 3/2003 | Stevens et al. |
| 6,570,875 | B1 | 5/2003 | Hegde |
| 6,577,644 | B1 | 6/2003 | Chuah et al. |
| 6,584,508 | B1 | 6/2003 | Epstein et al. |
| 6,594,268 | B1 | 7/2003 | Aukia et al. |
| 6,601,082 | B1 | 7/2003 | Durham et al. |
| 6,611,864 | B2 | 8/2003 | Putzolu et al. |
| 6,621,793 | B2 | 9/2003 | Widegren et al. |
| 6,622,170 | B1 | 9/2003 | Harrison et al. |
| 6,625,657 | B1 | 9/2003 | Bullard |
| 6,651,191 | B1 | 11/2003 | Vacante et al. |
| 6,671,724 | B1 | 12/2003 | Pandya et al. |
| 6,684,244 | B1 | 1/2004 | Goldman et al. |
| 6,760,761 | B1 | 7/2004 | Sciacca |
| 6,826,597 | B1 | 11/2004 | Lonnroth et al. |
| 6,895,414 | B2 | 5/2005 | Ford et al. |
| 6,952,703 | B1 | 10/2005 | Kathail et al. |
| 7,054,901 | B2 | 5/2006 | Shafer |
| 7,096,256 | B1 | 8/2006 | Shafer |
| 7,096,465 | B1 * | 8/2006 | Dardinski et al. ............ 717/178 |
| 7,103,616 | B1 | 9/2006 | Harmer et al. |
| 7,111,206 | B1 | 9/2006 | Shafer et al. |
| 7,114,008 | B2 | 9/2006 | Jungck et al. |
| 7,146,414 | B1 | 12/2006 | Sievert et al. |
| 7,233,975 | B1 * | 6/2007 | Gerraty et al. ................ 709/213 |
| 7,305,658 | B1 | 12/2007 | Hamilton et al. |
| 7,363,351 | B1 * | 4/2008 | Shafer .......................... 709/217 |
| 7,506,337 | B2 | 3/2009 | Iyer |
| 7,523,097 | B1 * | 4/2009 | Wilson et al. ................. 709/213 |
| 7,558,835 | B1 * | 7/2009 | Shafer .......................... 709/213 |
| 7,606,888 | B2 * | 10/2009 | Tanner et al. ................. 709/223 |
| 7,640,317 | B2 * | 12/2009 | Jain et al. ..................... 709/213 |
| 7,779,404 | B2 * | 8/2010 | Movassaghi et al. ......... 717/171 |
| 7,865,578 | B1 * | 1/2011 | Gerraty ........................ 709/220 |
| 2002/0174207 | A1 | 11/2002 | Battou |
| 2003/0007451 | A1 | 1/2003 | Ochiai et al. |
| 2003/0051008 | A1 * | 3/2003 | Gorthy et al. ................. 709/220 |
| 2003/0101240 | A1 * | 5/2003 | Courtney ..................... 709/220 |
| 2003/0120678 | A1 | 6/2003 | Hill et al. |
| 2003/0221190 | A1 * | 11/2003 | Deshpande et al. .......... 717/171 |
| 2004/0139179 | A1 * | 7/2004 | Beyda .......................... 709/221 |
| 2005/0033805 | A1 | 2/2005 | Fujiyama et al. |
| 2005/0052578 | A1 | 3/2005 | Phillips et al. |
| 2005/0204186 | A1 | 9/2005 | Rothman et al. |
| 2005/0246687 | A1 | 11/2005 | Scott |
| 2006/0031183 | A1 | 2/2006 | Oral et al. |
| 2006/0031427 | A1 | 2/2006 | Jain et al. |
| 2006/0080424 | A1 | 4/2006 | Sun et al. |

OTHER PUBLICATIONS

D. Durham, et al., "The COPS (Common Open Policy Service) Protocol," Jan. 2000, Network Working Group, Request for Comments: 2748, pp. 1-38.

S. Herzog, et al., "COPS usage for RSVP," Jan. 2000, Network Working Group, Request for Comments: 2749, pp. 1-17.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.

USPTO, International Search Report, Written Opinion, and Notification of Transmittal, Aug. 6, 2007, published by USPTO, Arlington, Virginia, 8 pages.

The Patent Office of the People's Republic of China, "The Second Office Action," Apr. 14, 2010, Application No. 200580019076.8, 3 pages.

"Currently Pending Claims After the First Office Action," Application No. 200580019076.8, 20 pages.

Chinese Patent Application No. 200580019076.8, Office Action issued Nov. 2, 2010, 4 pages.

Chinese Patent Application No. 200580019076.8, current claims.

* cited by examiner

TWO-STAGE NETWORK DEVICE CONFIGURATION PROCESS

RELATED APPLICATIONS

This application is related to co-pending U.S. patent application Ser. No. 10/866,338, filed Jun. 10, 2004, invented by Mark Freskos et al., entitled "Transport-Independent Pluggable Operation Type Handler Framework For Servicing XML Management Requests," the entire disclosure of which is hereby incorporated by reference as if fully set forth herein.

This application is also related to co-pending U.S. patent application Ser. No. 10/866,067, filed Jun. 10, 2004, invented by Jiong Sun et al, entitled "A Generic Framework For Deploying EMS Provisioning Services," the entire disclosure of which is hereby incorporated by reference as if fully set forth herein.

This application is also related to co-pending U.S. patent application Ser. No. 10/866,528, filed Jun. 10, 2004, invented by Kapil Jain et al, entitled "Configuration Commit Database Approach And Session Locking Approach In A Two-Stage Network Device Configuration Process," which is a continuation of this application, the entire disclosure of which is hereby incorporated by reference as if fully set forth herein.

This application is also related to co-pending U.S. patent application Ser. No. 10/866,169, filed Jun. 10, 2004, invented by Mark Freskos et al, entitled "Protocol For Efficient Exchange Of XML Documents With A Network Device," the entire disclosure of which is hereby incorporated by reference as if fully set forth herein.

FIELD OF THE INVENTION

The present invention relates to configuring a network device using a two-stage model.

BACKGROUND

It is often necessary to modify the configuration of a network device, such as a router. Typically, to effect a configuration change in a router a user would issue one or more command line interface (CLI) commands to the router. As each CLI command is submitted to the router, the router interprets the commands and executes the command immediately. As each CLI command is executed, the command effects a change to the current operational configuration of the router.

This approach has several disadvantages. First, more than one user may wish to modify the configuration of the network device at the same time. If two or more users are submitting CLI commands to the router simultaneously, then the commands from each user will be executed as they are entered. As a result, the configuration changes entered by one party will interfere with the configuration changes entered by any other party.

Second, as each command is interpreted and executed as it is submitted to the router, it is possible that one command submitted by a user may be executed, while another command submitted by the same user may not be executed, e.g., the command is not executed because the command contains a syntax error or the command may not be a valid command. Consequently, only a partial set of the desired configuration changes may be performed on the network device. However, this may result in an undesirable configuration for the network device, as the resulting configuration was not intended.

Consequently, there is a need in the art to effect a modification of a network device without incurring the disadvantages associated with the above described approaches. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the description of the embodiments herein.

Functional Overview

Embodiments of the invention provide for modifying the configuration of a network device, such as a router, using a two-stage configuration model. In the first stage, a first request is received for a change in configuration of a network device is received. Configuration data identified by the first request is stored, but the first request is not performed. In the second stage, after obtaining an exclusive lock on the network device in response to receiving a second request to modify the current operational state of the network device to reflect the stored configuration data, the current operational state of the network device is modified to reflect the configuration data. Thus, the configuration of a network device is modified only after obtaining the exclusive lock on the network device in the second stage of the two-stage model. The first and second request may be comprised in an XML document.

More specifically, in an embodiment, the network device receives an XML document containing a first request for a change in configuration of the network device to a potential operational state from a current operational state of the network device. The configuration data describes the change in configuration of the network device.

Next, the configuration data is stored in a buffer. At this point, processing is still "in the first stage;" consequently, the configuration data stored in the buffer may be parsed to check for syntax errors, but the configuration of the network device is not changed.

Thereafter, an XML document containing a second request is received, at the network device, which requests the current operational state of the network device to be modified to reflect the configuration data stored in the buffer. Before the current operational state of the network device can be modified, it is necessary for the user associated with the first and second request to obtain an exclusive lock on the network device. Having possession of the exclusive lock prevents another user from changing the current operational state of the network device. In effect, once the exclusive lock is obtained on the network device, processing enters the "second stage." After the user has obtained the exclusive lock, the current operational state of the network device is modified to reflect the configuration data.

Employment of the two-stage configuration model allows multiple users to modify a network device without interfering with one another because conflicts are avoided through use of the exclusive lock. An exclusive lock may be obtained explicitly, through a user command to obtain the lock, or implicitly by requesting the network device to commit a set of configuration, Thus, a user who has not explicitly requested and received an exclusive lock may still issue requests to the network device to commit configuration data, and the network device will interpret the request to commit any configuration changes to the network device as an implicit request for an exclusive lock. Also, as configuration data is saved at the network device, a user can modify the configuration of the network device to reflect a prior configuration or may view an earlier configuration of the network device. Moreover, the network device provides a mechanism for a user to modify, save, and error check submitted requests in real time.

Other embodiments are described in further detail herein.

Architecture Overview

Figure 1:
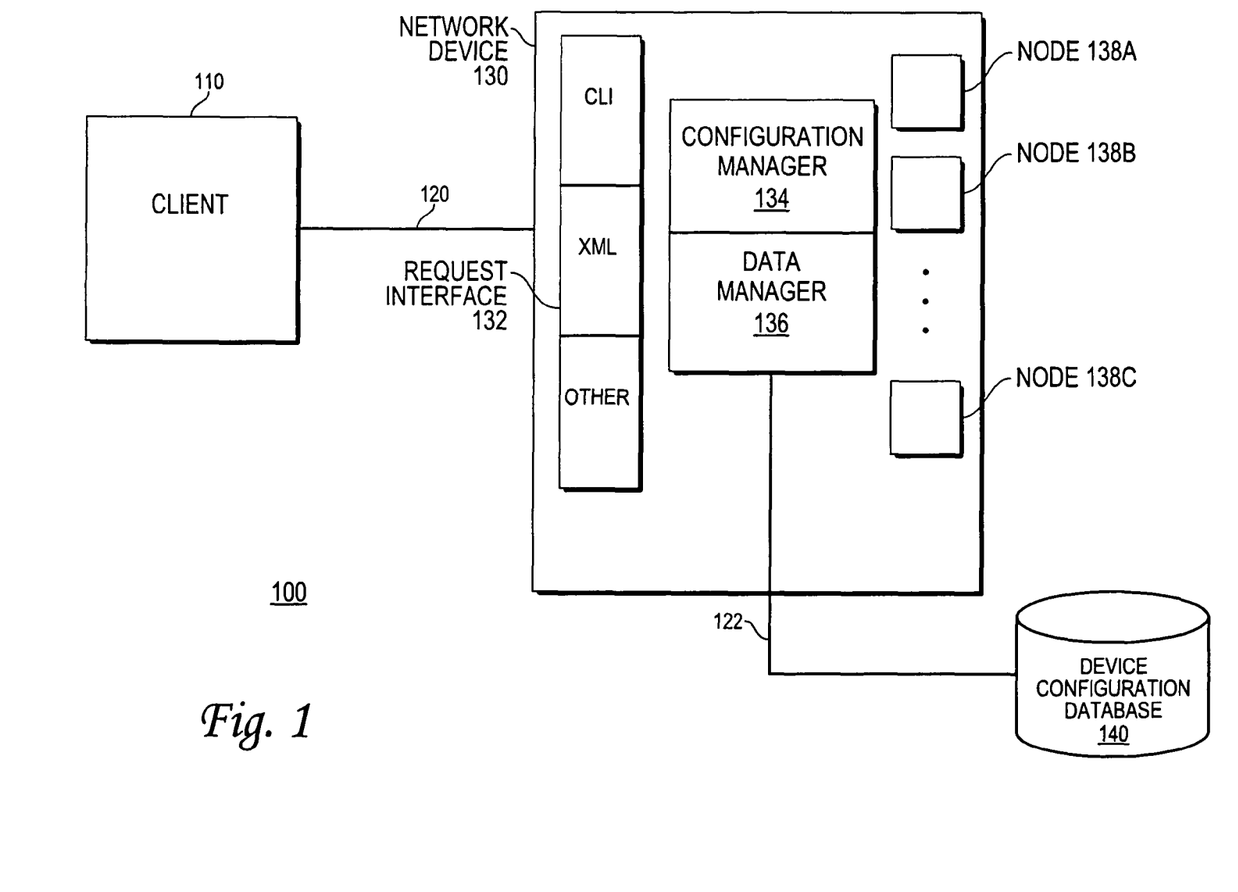
FIG. 1 is a block diagram of a system according to an embodiment.

FIG. 1 is a block diagram of a system 100 according to an embodiment. The system 100 of FIG. 1 may be used to modify the configuration of a network device using a two-stage configuration model. System 100 includes a client 110, communications links 120 and 122, a network device 130, and a device configuration database 140.

A client, such as client 110, may be implemented by any medium or mechanism that provides for the transmission of a command or request to a network device. Client 110 may be implemented in software or in hardware. Examples of client 110 include, without limitation, a web browser, a software application executing on a machine, a wireless device, and a management console. While only client 110 is shown in FIG. 1, embodiments may include any number of clients in system 100.

Communications link 120 may be implemented by any medium or mechanism that provides for the exchange of data between client 110 and network device 130. Communications link 122 may be implemented by any medium or mechanism that provides for the exchange of data between network device 130 and device configuration database 140. Examples of communications links 120 and 122 include, without limitation, a network such as a Local Area Network (LAN), Wide Area Network (WAN), Ethernet or the Internet, or one or more terrestrial, satellite or wireless links.

A network device, such as network device 130, may be implemented by device that is accessible to a network and is capable of being configured. Examples of network device 130 include, without limitation, a router, a server, a PC, a wireless device, a firewall, and a cell phone. While only network device 130 is shown in FIG. 1, embodiments may include any number of network devices in system 100.

Network device 130 includes a request interface 132, a configuration manager 134, a data manager, and one or more nodes 138. A request interface, such as request interface 132, may be implemented by any software component executing on network device 130 that is capable of exchanging communications with client 110. Request interface 132 may exchange communications using a variety of transport protocols. Request interface 132 may also process communications encoded using a variety of protocols, including, but not limited to, CLI and XML.

A configuration manager, such as configuration manager 134, may be implemented by any software component executing on network device 130 that is capable of managing the configuration of the network device. For example, configuration manager 134 may process any request received by request interface 132 that concerns the configuration of the network device.

A data manager, such as a data manager 136, may be implemented by any software component executing on network device 130 that is capable of managing the persistent storage of data to a device configuration database.

A node, such as node 138A, 138B, and 138C, may be implemented by any hardware or software component of network device 130 that may be separately configurable. Examples of node 138A, 138B, and 138C include, without limitation, a line card and a software module that is configurable.

A device configuration database, such as device configuration database 140, as broadly used herein, refers to any medium or mechanism that provides for the persistent storage of data. Examples of device configuration database 140 include, without limitation, a relational database, an object-oriented database, a multidimensional database, a hierarchical database, a file server, and an EPROM chip.

Operation of Two-Stage Configuration Model

Figure 2:
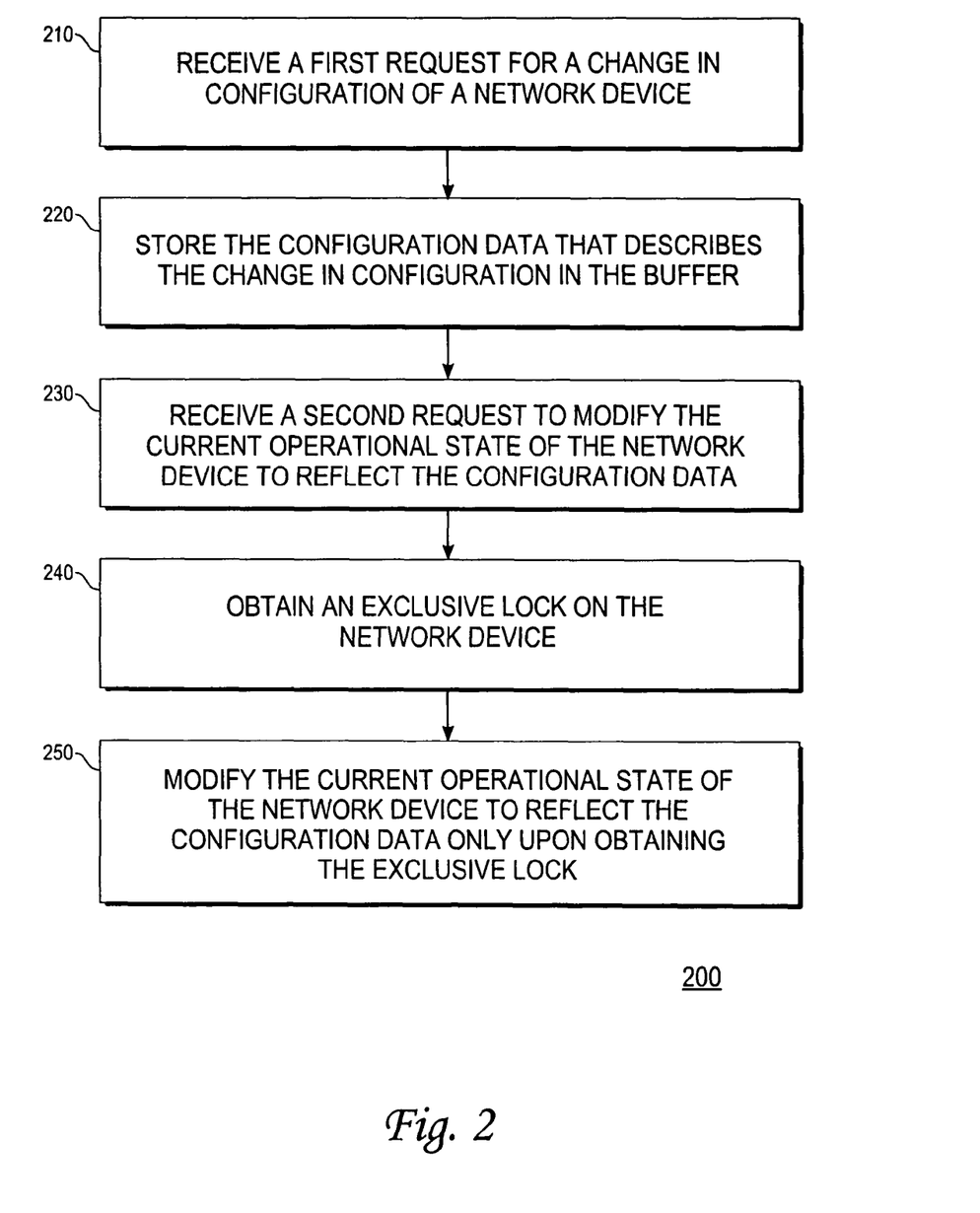
FIG. 2 is a flow chart illustrating the high level functional steps according to an embodiment.

FIG. 2 is a flow chart illustrating the functional steps according to an embodiment. Through the performance of the functional steps of FIG. 2, network device 130 may be configured using a two-stage configuration model. The functional steps of FIG. 2 shall be described below with reference to the illustrative system 100 depicted in FIG. 1.

In step 210, a first request from client 110 to network device 130 over communications link 120 is received. In an embodiment, request interface 132 receives the first request of step 210.

Request interface 132 may receive requests containing one or more commands from client 110 using a variety of transport protocols. Request interface 132 may process requests encoded using a variety of protocols. Request interface 132 may comprises one or more components that parse communications encoded using different protocols, such as CLI and XML. For example, request interface 132 may comprise a component that parses CLI commands, as shown in FIG. 1. Thus, when client 110 transmits a CLI command to request interface 132, request interface 132 is able to process the CLI command.

In another example, request interface 132 may comprise a component that parses XML communications. Request interface 132 may contain a component, as shown in FIG. 1, that can read XML documents and process XML tags and associated information that are contained therein. The processing of requests sent from client 110 to network device 130 that are contained within an XML document shall be explained in greater detail below. Request interface 132 may also expose an API that allows client 110 to issue requests to network device 130.

In an embodiment, the first request of step 210 may contain one or more commands, e.g., the communication may be an XML document that contains one or more commands. One or more the functions listed in Table 1 may be performed by the request received in step 210. Note that Table 1 is merely illustrative, as the request received in step 210 may perform other functions than those listed in Table 1.

TABLE 1

Modify the current operational configuration according to a set of configuration data
Lock the current operational configuration
Unlock the current operational configuration
Retrieve the change made to the configuration data stored in the buffer
Retrieve the current operational configuration
Retrieve a merged configuration reflecting both the configuration data in the buffer and the current operational configuration
Retrieve the configuration changes resulting from a commit operation
Retrieve the configuration changes resulting from a rollback operation
Load the buffer with configuration data stored in a device configuration database
Load the buffer with the failed configuration from the most recent commit operation
Save the contents of a buffer containing configuration data to a device configuration database
Commit the contents of the buffer to cause the current operational state to reflect the configuration data stored in the buffer
Clear the contents of the buffer
Rollback a set of configuration changes
Retrieve the configuration history regarding a set of commits
Retrieve the configuration history regarding all users that are currently configuring the network device Note that the request received in step 210 may be expressed in a variety of forms, including: CLI commands, commands contained within an XML document, one or more calls through an exposed API of request interface 132, or another protocol which request interface 132 is configured to process.

To illustrate the functional steps of the two-stage configuration model, an example shall be described wherein a request is received in step 210 to change the configuration of a network device to a potential state from a current operational state of the network device. The request may accompany or reference configuration data. Configuration data is data that describes a change in the configuration of a network device. Configuration data may describe one or more specific configuration changes made to an operational state of the network device. The current operational state of the network device is the configuration of the network device as it is current operating.

Note that in this example, processing is currently in the first stage of the two-stage model, because prior to entering the second stage of the two-stage model, one needs to obtain the exclusive lock on the network device. After the performance of step 210, processing proceeds to step 220.

In step 220, the configuration data that describes the change in configuration of the network device as requested in step 210 is stored in a buffer. A buffer is any portion of volatile or non-volatile memory on network device 130 that may store configuration data. Upon receipt of the first request of step 210, request interface 132 may forward to configuration manager 134 any request that concerns the configuration of the network device. In an embodiment, configuration manager 134 stores the configuration data in the buffer in step 220.

After configuration data is stored in the buffer after the performance of step 220, the configuration data may be viewed by a user. A user may transmit a request from client 110 to network device 130 to view the configuration data stored in the buffer. In response to receiving such a request, the configuration manager 134 may create and provide a view to the user of the configuration data stored in the buffer. For example, the configuration manager 134 may retrieve the configuration data stored in the buffer, and transmit the retrieved configuration data to the user.

In an embodiment, the network device 130 may comprise a set of one of more buffers. In such an embodiment, each buffer of the set of one or more buffers may be associated with a single user. Each buffer of the set of one or more buffers may only store configuration data associated with the user to which the buffer is associated. For example, network device 130 may comprise 100 buffers, and each of the 100 buffers only stores configuration data for a single user at a time. When a request is received at the network device, the user associated with the request is assigned to a buffer. Thereafter, configuration data associated with that user is stored in the buffer to which the user is assigned. After a period of time elapses, the user may no longer no assigned to a particular buffer; consequently, the next time the user submits a request to network device 130, that user may be assigned to a different buffer.

Two or more users may transmits request for a change in configuration of the network device contemporaneously because the configuration data associated with each user will be stored in a separate buffer. A user can save configuration data to the network device independent of the activity of any other user. A user can modify the configuration of the network device when other users are transmitting requests for a change in configuration of the same network device, except as discussed below, e.g., a user may be prevented from modifying the configuration of the network device if that user cannot obtain an exclusive lock. After the processing of step 220, processing proceeds to step 230.

In step 230, a second request to modify the current operational state of the network device to reflect the configuration data stored in the buffer is received. Request interface 132 may receive the second request from client 110. The second request of step 230 is transmitted from the same user or party as the first request of step 210. As explained above, when request interface 132 determines that the second request of step 230 concerns the configuration of the network device, request interface 132 communicates with configuration manager 134 to inform configuration manager 134 of the second request of step 230. If the network device comprises more than one buffer, then the second request of step 230 refers to the buffer that is associated with the user or party that transmitted the second request of step 230. After the performance of step 230, processing proceeds to step 240.

In step 240, an exclusive lock on the network device is obtained, through either an explicit or implicit request. In an embodiment, configuration manager 134 may obtain the exclusive lock for a user associated with the second request. Having possession of the exclusive lock prevents another user from changing the current operational state of the network device. In effect, once the exclusive lock is obtained on the network device, the "second stage" is entered.

In one embodiment, a user may obtain an exclusive lock by submitting an explicit request for the exclusive lock using a specified command. In that embodiment, after the network device processing a request from a user for the exclusive lock, that user has the exclusive lock until the exclusive lock is released. In another embodiment, whenever a user submits a request to modify the current operational state of the network device to reflect the configuration data stored in a buffer, the network device interprets the request as an implicit request for a lock, and that user may automatically obtain the exclusive lock unless another user already holds the exclusive lock. In an embodiment, if a user is unable to obtain the exclusive lock, that user may be notified that the request was not performed because the user could not obtain the exclusive lock.

The user must wait until the lock is released and attempt the commit operation again. Requesting the lock explicitly provides a way to ensure that the lock is obtained before the commit operation is requested. However, obtaining an exclusive lock does not guarantee that a commit of a configuration will succeed; for example, if a back-end system failure occurs, then the configuration for which a commit is requested may not become part of the operational state of the network device. After the performance of step 240, processing proceeds to step 250.

In step 250, the current operational state of the network device is modified to reflect the configuration data. Note that the current operational state of the network device is modified to reflect the configuration data is step 250 only upon obtaining the exclusive lock either explicitly or implicitly. Step 240 may be performed by configuration manager 134. As a result of configuration manager 134 performing step 250, the current operational state of the network device reflects the configuration data that was stored in the buffer in step 220. In an embodiment, after the performance of step 240, the configuration data stored in the buffer is removed.

As all configuration changes identified in the configuration data are made to network device 130 contemporaneously in step 250, significant performance benefits are achieved. Effecting multiple configuration changes contemporaneously is more efficient than applying each configuration change to network device 130 individually.

Applications of Storing Configuration Data in Device Configuration Database

Embodiments store configuration data to enable a user to modify the configuration of the network device to reflect the configuration of the network device at an earlier point in time. A historical record of the configuration data that has been used to modify the current operational state of the network device may also be viewed by a user associated with client 110. Configuration data may describe any changes made to the operational state of network device 130 or any node 138 on network device 130.

Whenever a request to modify the current operational state of the network device to reflect a set of configuration data is performed, such as when step 250 of FIG. 2 is performed, the configuration data is persistently stored. In an embodiment, in performing step 250, configuration manager 134 instructs data manager 136 to store the configuration data, or a reference to where the configuration data is stored, in device configuration database 140. In an alternate embodiment, data manager 136 may persistently store the configuration data, or a reference to where the configuration data is stored, at network device 130.

In an embodiment, data manager 136 stores the configuration data in a binary file in device configuration database 140, where device configuration database 140 is a hierarchical database. The binary file references information that describes, for each of the one or more configuration changes described in the configuration data, details about the configuration change. For example, the binary file could reference information that describes, for each configuration change, when the configuration change was made (for example, a timestamp), what user initiated the configuration change, which client application transmitted the request to make the configuration change, and a location from which the configuration change was initiated (for example, which client or port on the client initiated the request).

In an embodiment, device configuration database 140 stores configuration history data. Configuration history data is data that describes all changes in the operational state of the network device that occur over a period of time. Configuration history data may be generated by aggregating the configuration data stored in device configuration database 140.

Configuration manager 134 can process a request from client 110 to view the configuration history data. Configuration manager 134 may retrieve configuration history data associated with a particular point in time or a particular state of network device 130 and transmit the configuration history data to client 110. In this manner, client 110 may view configuration history data of network device 130 associated with any point in time or any state of network device 130. In an embodiment wherein the configuration data describes a set of changes made between operational states of network device 130, rather than fully describing the complete configuration of network device 130, configuration manager 134 may dynamically determine information that fully describes the configuration of network device 130 at the desired particular point in time or state by applying the set of changes described in the configuration data to a base configuration, as described in further detail below.

Client 110 may view the set of configuration changes made from a first operational state to a second operational state of network device 130. If client 110 transmits a request to network device 130 to view configuration data with reference to a first point in time and a second point in time, configuration manager 134 can use the configuration history data to determine a set of configuration changes between the operational state of the network device associated with the first point in time and the operational state of the network device associated with the second point in time.

The set of configuration changes generated by configuration manager 134 between two operational states of the network device may be generated either from a forward-looking perspective or from a backward-looking perspective. In other words, for a given starting point in time, the configuration manager 134 can use the configuration history data to generate a set of configuration changes associated with an operational state that is earlier than the starting point or later than the starting point. The requested information about the configuration changes may then be transmitted from network device 130 to client 110.

In an embodiment, for a particular configuration change made to network device 130, device configuration database 140 may only store data that describes only a set of configuration options that changed from a first operational state of network device 130 to a second operational state of network device 130, rather than storing data that fully describes the second operation state of network device 130. For example, if only 10% of the configuration changed from a first operational state of the network device to a second operational state of the network device, then only the configuration data that reflects the 10% of the configuration of the network device that changed is stored in device configuration database 140. As the configuration history data allows configuration manager 134 to identify the operational state of the network device at an earlier point in time, only the difference between operational states of the network device needs to be stored in order for configuration manager 134 to determine the complete state of the network device at any point in time since configuration history data was stored.

Since data that describes all changes in the operational state of the network device that occur over a period of time is stored in the device configuration database as configuration history data, the current operational state of the network device may be "rolled back" or returned to an operational state associated with an earlier point in time. A request from a user maybe processed wherein the current state of the network device is changed to reflect the configuration data associated with an earlier point in time. Since a user associated with client 110 may view the configuration data associated with any operational state of network device 130 that is reflected in the configuration history data, the user may view prior configuration data applied to the operational state of the network device 130 and roll back the current operational state of the network device 130 to reflect that configuration data. Consequently, any user of client 110 can alter the configuration of network device 130 to correspond to any prior configuration state, and that user can view information that describes the configuration of any prior state of network device 130, which enable the user to understand exactly what the configuration of network device 130 will be before the rollback operation is made.

In an embodiment, the configuration of the current operational state of the network device may only be returned to an operational state associated with an earlier point in time if a user has a sufficient privilege level. For example, the user may need to be a "root" user to perform a rollback operation. To illustrate, assume a request to change the configuration of the network device from the current operational state of the network device to a prior operational state of the network device is received by request interface 132. Thereafter, request interface 132 forwards the request to configuration manager 134. Configuration manager 134 determines if the user associated with the request has a sufficient privilege level for the request to be performed. Configuration manager 134 only changes the configuration of the network device from the current operational state of the network device to a prior operational state of the network device specified in the request upon determining that the user has the sufficient privilege level for the request to be performed Data manager 136 may periodically perform a rebase operation. A rebase operation creates a new base configuration from the set of configuration history data stored in device configuration database 140. Network device 130 loads (or "boots") a base configuration whenever network device 130 is initially turned on. If one or more configuration changes have been made to the base configuration, then the network device 130 applies those configuration changes to the base configuration to ensure the configuration of network device 130 is current. Performing a periodic rebase operation advantageously reduces the number of configuration changes that need to be applied to the base configuration. Data manager 136 may perform a rebase operation in response to a variety of events, e.g., (a) the number of commits performed on network device 130 exceeds a configurable threshold, or (b) the size of the configuration data stored in device configuration database 140, or a portion therefore, exceeds a configurable threshold.

Data manager 136 may periodically perform a trim operation. A trim operation is an operation to reduce the amount of configuration changes that are stored in the device configuration database 140 by deleting the oldest configuration changes in the configuration history data. A trim operation reduces the amount of storage space required to store configuration history data. A trim operation may advantageously remove configuration changes made to network device 130 that are no longer needed, e.g., a rebase operation may make storing a particular configuration change made to network device 130 unnecessary if the base configuration already reflects that configuration change. Data manager 136 may perform a trim operation in response to a variety of events, e.g., (a) the number of commits performed on network device 130 exceeds a configurable threshold, (b) the size of the configuration data stored in device configuration database 140, or a portion therefore, exceeds a configurable threshold, (c) the passage of a configurable amount of time, or (d) in response to a request issued by client 110.

Error Checking

In an embodiment, configuration manager 134 may comprise a parser. A parser is any component that is capable of determining whether a request contains an error or is otherwise unable to be performed. The parser may be used by configuration manager 134 to determine whether a request contains one or more syntax errors. In an embodiment, only a received request for a change in the configuration of the network device associated with a user that has not yet obtained the exclusive lock on the network device is processed to determine whether the request contains one or more syntax errors.

In response to a determination that a request contains one or more syntax errors, a communication may be transmitted from the network device to the user that transmitted the request containing the one or more syntax errors. The communication may comprise information about the determination that a request contains one or more syntax errors, e.g., a description of the one or more syntax errors that are contained with the request. Alternatively, if the communication sent to the user does not describe the one or more syntax errors that are contained with the command, a second communication that does describe the one or more syntax errors that are contained with the command may be sent to the user in response to receiving a request for that information from the user.

In an embodiment, configuration manager 134 may determine whether a request contains one or more semantic errors or one or more verification errors. In an embodiment, configuration manager 134 only determines whether a request contains one or more semantic errors or one or more verification errors if a user associated with the request has obtained an exclusive lock on the network device, and the user has transmitted a request to network device 130 to modify the current operational state of network device 130 to reflect configuration data stored in the buffer. Semantic errors and verification errors generally arise from back end processing entities that cannot process the request. For example, semantic errors and verification errors include a duplicate IP address contained within the request and inclusion of a user name or user group that does not exist.

In response to determining that a request contains one or more semantic errors or one or more verification errors, configuration manager 134 may transmit a communication to the user issuing the request that indicates information about the determination that the request contains one or more semantic errors or one or more verification errors, e.g., the communication may describe the one or more semantic errors or one or more verification errors found within the request.

Executing Atomic and Best Effort Configuration Changes

Embodiments provide for processing a request based on whether the particular request is an "atomic" request or a "best effort" request. An "atomic" request is a request that is performed only if it is determined that each of the one or more configuration changes described by the configuration data associated with the request is capable of being performed. Thus, if a request is an atomic request, if any of the one or more configuration change described by the configuration data associated with the request cannot be performed, then none of the configuration changes described by the configuration data associated with the request are performed.

In an embodiment that processes atomic requests, configuration manager 134 determines if a request requires that each of the one or more configuration changes described by the configuration data associated with the request be performed. In response to a determination that the request requires that each of the one or more configuration changes described by the configuration data associated with the request be performed, the configuration manager 134 determines if each of the one or more configuration changes is capable of being performed. Thereafter, if each of the one or more configuration changes is capable of being performed, then the configuration manager 134 modifies the current operational state of the network device to reflect the configuration data.

A "best effort" request, on the other hand, is a request that is executed regardless of whether a particular configuration change described by the configuration data associated with the request is not capable of being performed. Thus, if a request is a best effort request, even if one or more of the configuration changes described by the configuration data associated with the request cannot be performed, then the one or more configuration changes described by the configuration data that are capable of being performed are still performed.

In an embodiment that processes best effort requests, configuration manager 134 determining if the request requires that each of the one or more configuration changes described by the configuration data associated with the request be performed. In response to a determination that the request does not require that each of the one or more configuration changes described by the configuration data associated with the request be performed, then the configuration manager 134 modifies the current operational state of the network device to reflect any of the one or more configuration changes described by the configuration data that can be performed, even if one or more configuration changes described by the configuration data associated with the request are not capable of being performed.

XML Interface for Two-Stage Configuration Operations

Client 110 may transmit a XML document over communications link 120 to request interface 132. The XML document may contain one or more requests that are formatted according to any of a variety of request syntax conventions, such as the Cisco CLI syntax. The XML document may be sent to the network device using any of several transport mechanisms including CORBA, Telnet, SSH, etc. Any request may be contained in the XML document, e.g., any request in Table 1 may be contained within an XML document. Also, a request contained within an XML document may be associated with different types of management operations. For example, the request may be to (a) manipulate the native management data on the network device, e.g., by processing operations to get, set (i.e., modify), create, or delete instances of management data, (b) process an operation regarding more advanced configuration services on the network device, e.g., a lock operation, an unlock operation, a commit operation, or a rollback operation, or (c) perform a command line interface (CLI) operation.

Note that subsequent requests from the client to the network device and/or responses from the network device to the client which are contained within XML documents may be associated with different types of management operations than of the prior requests. Each request from a client to a network device may view the effects of other requests, even if those requests are of different types of management operations. For example, a first request contained within an XML document may cause configuration data to be stored in a buffer, while a second request contained within an XML document may be associated may view the configuration data stored in the buffer, even if the second request is associated with a different type of management operation than the first request.

Request interface 132 may process the received XML document to extract any requests in the XML document, and thereafter forward those requests to configuration manager 134 so that the requests may be processed. An illustrative example of an XML document containing multiple requests (or operations) sent from client 110 to network device 130 is described below in the pseudocode of Example 1.

Example 1

<?xml version="1.0" encoding="UTF-8"?>
<Request MajorVersion="1" MinorVersion="0">
<Operation 1>
. . .
Operation 1 data is contained here.
. . .
</Operation 1>
<Operation 2>
. . .
Operation 2 data is contained here.
. . .
</Operation 2>
</Request>

In response to receiving the XML document illustrated in Example 1, configuration manager 134 processes the requests contained therein. Request interface 134 may forward any embedded commands within the XML document that relate to the configuration of network device 130 to configuration manager 134. After configuration manager 134 has processed the request, request interface 132 may transmit response data that describes a result of processing the request on network device 130 to client 110. An illustrative example of an XML document containing response data sent from network device 130 to client 110 is described below in the pseudocode of Example 2.

Example 2

<?xml version="1.0" encoding="UTF-8"?>
<Response MajorVersion="1" MinorVersion="0">
<Operation 1>
. . .
Operation 1 response data is contained here.
. . .
</Operation 1>
<Operation 2>
. . .
Operation 2 response data is contained here.
. . .
</Operation 2>
</Response>

Note that the XML document sent from client 110 of Example 1 circumscribes requests with a "Request" tag, while the XML document sent from network device 130 of Example 2 circumscribes response data with a "Response" tag.

Client 110 may transmit an XML document to network device 130 to request the current running BGP configuration of network device 130, as shown below in Example 3.

Example 3

```
<?xml version="1.0" encoding="UTF-8"?>
<Request MajorVersion="1" MinorVersion="0">
  <Get>
    <Configuration Source="CurrentConfig">
      <BGP MajorVersion="1" MinorVersion="0"/>
    </Configuration>
  </Get>
</Request>
```

In response to receiving the XML document of Example 3, network device 130 may transmit an XML document containing the current running BGP configuration of network device 130, as shown below in Example 4.

```
<?xml version = "1.0" encoding = "UTF-8"?>
<Response MajorVersion = "1" MinorVersion = "0">
  <Get>
    <Configuration>
      <BGP MajorVersion = "1" MinorVersion = "0">
        <AS>
          <Naming>
            <AS>3</AS>
          </Naming>
          <Global>
            <DefaultMetric>5</DefaultMetric>
            <GlobalTimers>
              <Keepalive>30</Keepalive>
              <Holdtime>90</Holdtime>
            </GlobalTimers>
            ...
            More BGP config data returned here.
            ...
      </BGP>
    </Configuration>
  </Get>
</Response>
```

Client 110 may transmit to network device 130 an XML document containing configuration data which will be stored in the buffer of network device 130, as shown below in Example 5.

```
<?xml version = "1.0" encoding = "UTF-8"?>
<Request MajorVersion = "1" MinorVersion = "0">
  <Set>
    <Configuration>
      <BGP MajorVersion = "1" MinorVersion = "0">
        <AS>
          <Naming>
            <AS>3</AS>
          </Naming>
          <Global>
            <DefaultMetric>10</DefaultMetric>
            <GlobalTimers>
              <Keepalive>60</Keepalive>
              <Holdtime>180</Holdtime>
            </GlobalTimers>
          </Global>
        </AS>
      </BGP>
    </Configuration>
  </Set>
</Request>
```

In response to receiving the XML document of Example 5, network device 130 may transmit an XML document containing an acknowledgement that the configuration data has been received and stored in the buffer, as shown below in Example 6.

Example 6

```
<?xml version="1.0" encoding="UTF-8"?>
<Response MajorVersion="1" MinorVersion="0">
  <Set>
    <Configuration/>
  </Set>
</Response>
```

Client 110 may transmit to network device 130 an XML document containing a request to commit configuration data stored in the buffer of network device 130, as shown below in the Example 7.

Example 7

```
<?xml version="1.0" encoding="UTF-8"?>
<Request MajorVersion="1" MinorVersion="0">
  <Commit Mode="Atomic" Label="BGPUpdate"
    Comment="Sample BGP config update"/>
</Request>
```

In response to receiving the commit request contained within the XML document of Example 7, network device 130 may transmit an XML document containing an acknowledgement that the commit request has been performed, as shown below in Example 8.

Example 8

```
<?xml version="1.0" encoding="UTF-8"?>
<Response MajorVersion="1" MinorVersion="0">
  <Commit Mode="Atomic" Label="BGPUpdate"
    Comment="Sample BGP config update"/>
</Response>.
```

Note that a request from client 110 to network device 130, which is contained within an XML document, may correspond to a first type of management operation, and the response from the network device 130 to the client 110, which is contained within another XML document, may correspond to a second type of management operation. This may be advantageous when a user associated with client 110 is more accustomed to issuing requests to network device 130 that correspond to a first type of management operation, but prefers to view information about the results of processing the request on network device 130 in accordance with a second type of management operation. Example 9, shown below, illustrates a request from client 110 to network device 130, contained within an XML document, that corresponds to a manipulation of the native management data on network device 130. Example 10, shown below, illustrates a response from network device 130 to client 110, contained within an XML document, that corresponds to a CLI management operation that is made in response to the request of Example 9.

```
<?xml version="1.0" encoding="UTF-8"?>
<Request>
  <Set>
    <Configuration>
      <BGP>
        <AS>
          <Naming>
            <AS>65001</AS>
          </Naming>
          <Global>
            <GlobalAFTable>
              <GlobalAF>
                <Naming>
```

-continued

```
            <AF>IPv4Unicast</AF>
          </Naming>
          <SourcedNetworkTable>
            <SourcedNetwork>
              <Naming>
                <Network>
                  <IPV4Address>202.202.11.11
                  </IPV4Address>
                  <IPV4PrefixLength>32
                  </IPV4PrefixLength>
                </Network>
              </Naming>
            </SourcedNetwork>
          </SourcedNetworkTable>
        </GlobalAF>
      </GlobalAFTable>
    </Global>
  </AS>
</BGP>
    </Configuration>
  </Set>
</Request>
<?xml version="1.0" encoding="UTF-8"?>
<Request MajorVersion="1" MinorVersion="0">
  <CLI>
    <Configuration>
      show config
    </Configuration>
  </CLI>
</Request>
```

```
<?xml version="1.0" encoding="UTF-8"?>
<Request MajorVersion="1" MinorVersion="0">
  <CLI>
    <Configuration>
    show config
    </Configuration>
  </CLI>
</Request>
```

Example 10

```
<?xml version="1.0" encoding="UTF-8"?>
<Response MajorVersion="1" MinorVersion="0">
  <CLI>
    <Configuration>
    Building configuration . . .
    router bgp 65001
    address-family ipv4 unicast
    network 202.202.11.11/32
    !
    !
    end
    </Configuration>
  </CLI>
</Response>
```

Note that any request of any type of management operation that client 110 may issue to network device 130 may be contained within an XML document and processed according to the above explanation. Each command of any management operation may be identified by a particular tag and associated values in an XML document. Accordingly, not every request has been shown in an illustrative example; however, those skilled in the art will appreciate that any type of management operation that client 110 may issue to network device 130 may be contained within an XML document and processed according to embodiments of the invention.

Configuration Session Management and Locking

As explained above, users of clients, e.g., client 110, may obtain an exclusive lock on network device 130 which prevents another user to effect configuration changes on network device 130 while that user has the lock. If a first user attempts to modify the current operational state of network device 130 while a second user has an exclusive lock, then the request of the first user will be aborted by the configuration manager 134.

There are two types of exclusive locks: implicit and explicit. An implicit lock is obtained whenever a user initiates a request to modify the current operational state of network device 130 to reflect the configuration data stored in a buffer, e.g., when step 250 of FIG. 2 is performed. This implicit lock prevents a second user from making any configuration changes to network device 130 while a first user is in the process of making configuration changes to network device 130.

On the other hand, an explicit lock is obtained whenever a user specifically requests a lock unaccompanied by a request to modify the operational state of network device 130. An explicit lock is advantageous where a user does not wish another user to be able to modify the operational state of network device 130.

A client may transmit to network device 130 a request to determine which users are operational connected to network device 130 and which user has the exclusive lock. Configuration manger 134 maintains information about which users are connected to network device 130 and which user has the exclusive lock, including information about the session id of each user connected to network device 130, a timestamp associated with each user connected to network device 130, a username associated with each user connected to network device 130, a location identifier associated with each user connected to network device 130, and whether each user connected to network device 130 has an exclusive lock. Configuration manager 134 may process a request for this information received by network device 130 and thereafter cause a response to be transmitted to the requesting client that contains any information maintained by configuration manager 134 about the users connected to network device 130, such as information about which user has the exclusive lock.

Client 110 may transmit an XML document over communications link 120 to network device 130 that contains a request to obtain an exclusive lock. If the request is successful, network device 130 transmits a communication informing client 110 that client 110 has the exclusive lock. On the other hand, if the request is not successful, network device 130 transmits a communication informing client 110 why the exclusive lock was not obtained, e.g., an error code or error message may be provided to client 110. Example 11 illustrates a portion of a XML document that client 110 may transmit to network device 130 to request an exclusive lock.

Example 11

```
<?xml version="1.0" encoding="UTF-8"?>
<Request MajorVersion="1" MinorVersion="0">
  <Lock/>
</Request>
```

In response to receiving the request for an exclusive lock contained within the XML document of Example 11, network device 130 may transmit the XML document of Example 12 to client 110 to indicate that client 110 has the exclusive lock.

Example 12

```
<?xml version="1.0" encoding="UTF-8"?>
<Response MajorVersion="1" MinorVersion="0">
  <Lock/>
```

</Response>

Example 13 illustrates a portion of a XML document that client 110 may transmit to network device 130 to release the exclusive lock.

Example 13

<?xml version="1.0" encoding="UTF-8"?>
<Request MajorVersion="1" MinorVersion="0">
<Unlock/>
</Request>

In response to receiving the request to release the exclusive lock contained within the XML document of Example 13, network device 130 may transmit the XML document of Example 14 to client 110 to indicate that client 110 has released the exclusive lock.

Example 14

<?xml version="1.0" encoding="UTF-8"?>
<Response MajorVersion="1" MinorVersion="0">
<Unlock/>
</Response>

Multiple users may be operational connected to network device 130. In an embodiment, each user of a plurality of users may view the configuration data that another user of the plurality of users has saved in a buffer of network device 130. In this way, one user can view the configuration changes that another user is making to network device 130.

As mentioned above, configuration manger 134 maintains information about which users are connected to network device 130 and which user has the exclusive lock Network device 130 maintains information. Consequently, a user of client 110 may transmit a request to network device 130, which when processed by configuration manager 134, causes information to be sent to client 110 that describes which users are actively editing network device 130 and whether an exclusive lock has been assigned to any other user.

Implementing Mechanisms

Figure 3:
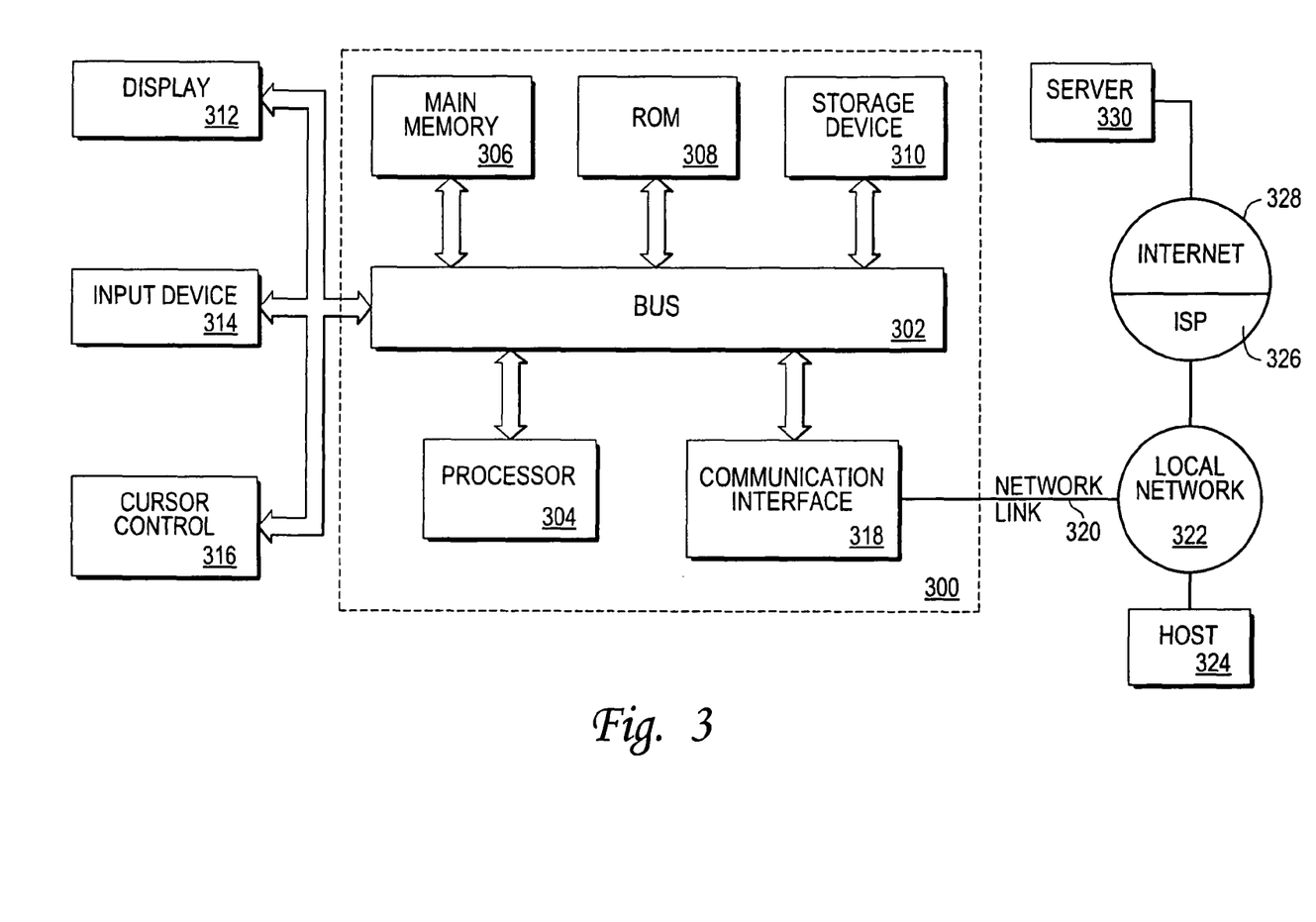
FIG. 3 is a block diagram that illustrates a computer system upon which an embodiment may be implemented.

In accordance with an embodiment, client 110 or network device 130 may be implemented on a computer system. FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, at a network device, a first request for a change in configuration of a network device to a potential operational state from a current operational state of the network device, wherein the first request comprises configuration data that describes the change in configuration of the network device;
   storing the configuration data from the first request in a buffer, wherein the change in configuration described by the configuration data includes two or more configuration changes;
   after the storing, receiving, at the network device, a second request to modify the current operational state of the network device to reflect the configuration data stored in the buffer, wherein the second request specifies that the current operational state of the network device should be modified to reflect any of the two or more configuration changes that can be performed even when at least one of the two or more configuration changes cannot be performed;
   obtaining an exclusive lock on the network device;
   modifying the current operational state of the network device to reflect the configuration data only upon obtaining the exclusive lock by:
   determining that the second request does not require at least one of the two or more configuration changes to be performed; and
   in response to determining that the second request does not require at least one of the two or more configuration changes described by the configuration data to be performed:
   modifying the current operational state of the network device to reflect one or more configuration changes that can be performed, wherein one or more other configuration changes are not capable of being performed and are not performed, wherein the two or more configuration changes comprise one or more configuration changes that can be performed and the one or more other configuration changes that are not capable of being performed;
   in response to a determination that a third request requires that each of a set of two or more configuration changes be performed:
   determining if each configuration change of the set of two or more configuration changes is capable of being performed, and
   modifying the current operational state of the network device to reflect the configuration data only if each configuration change of the set of two or more configuration changes is capable of being performed.

2. The method of claim 1, wherein the network device is a router.

3. The method of claim 1, wherein modifying the current operational state further comprises:
   storing the configuration data from the buffer to a device configuration database.

4. The method of claim 3, wherein the configuration data stored in the device configuration database reflects only a set of configuration options that changed from a first operational state of the network device to a second operational state of the network device.

5. The method of claim 3, wherein the device configuration database stores configuration history data that describes all changes in an operational state of the network device that occur over a period of time; and further comprising:
   creating and providing a view of the configuration history data stored in the device configuration database associated with a particular point in time.

6. The method of claim 5, further comprising:
   generating, based on the configuration history data, a set of configuration changes that describe the change in configuration between two different operational states of the network device.

7. The method of claim 1, further comprising creating and storing information identifying, for each of the two or more configuration changes, when the configuration change was made, what user initiated the configuration change, and a location from which the configuration change was initiated.

8. The method of claim 1, further comprising:
   prior to receiving the second request, creating and providing a view of the configuration data stored in the buffer.

9. The method of claim 1, wherein the buffer is a particular buffer in a set of buffers, and wherein the step of storing the configuration data further comprises:

determining that the particular buffer in the set of buffers is associated with a particular user associated with the first request.

10. The method of claim 1, further comprising:
determining whether the first request contains one or more syntax errors; and
in response to a determination that the first request contains one or more syntax errors, informing a user associated with the first request that the first request contains one or more syntax errors.

11. The method of claim 1, further comprising:
determining whether the second request contains one or more semantic errors or one or more verification errors; and
in response to a determination that the second request contains one or more semantic errors or one or more verification errors, informing a user associated with the second request that the second request contains one or more semantic errors or one or more verification errors.

12. The method of claim 1, wherein the first request is associated with a first user that holds an exclusive lock, wherein the exclusive lock indicates that only the holder of the exclusive lock may effect change to the current operational state of the network device, and further comprising:
determining that a fourth request to change the configuration of the network device is associated with a second user who does not have the exclusive lock; and
notifying the second user that the fourth request is not performed.

13. The method of claim 1, further comprising:
receiving a fourth request to change the configuration of the network device from the current operational state of the network device to a prior operational state of the network device;
determining if a user associated with the fourth request has a sufficient privilege level for the third request to be performed; and
changing the configuration of the network device from the current operational state of the network device to the prior operational state of the network device upon determining that the user has the sufficient privilege level for the fourth request to be performed.

14. The method of claim 1, wherein the first request and the second request are received using a command line interface (CLI).

15. The method of claim 1, wherein the first request and the second request are received in an XML document.

16. A non-transitory machine-readable medium carrying one or more sequences of instructions, wherein execution of the one or more sequences of instructions by one or more processors causes the one or more processors to perform the steps of:
receiving, at a network device, a first request for a change in configuration of a network device to a potential operational state from a current operational state of the network device, wherein the first request comprises configuration data that describes the change in configuration of the network device;
storing the configuration data from the first request in a buffer, wherein the change in configuration described by the configuration data includes two or more configuration changes;
after the storing, receiving, at the network device, a second request to modify the current operational state of the network device to reflect the configuration data stored in the buffer, wherein the second request specifies that the current operational state of the network device should be modified to reflect any of the two or more configuration changes that can be performed even when at least one of the two or more configuration changes cannot be performed;
obtaining an exclusive lock on the network device;
modifying the current operational state of the network device to reflect the configuration data only upon obtaining the exclusive lock by:
determining that the second request does not require at least one of the two or more configuration changes to be performed; and
in response to determining that the second request does not require at least one of the two or more configuration changes described by the configuration data to be performed: modifying the current operational state of the network device to reflect one or more configuration changes that can be performed, wherein one or more other configuration changes are not capable of being performed and are not performed, wherein the two or more configuration changes comprise one or more configuration changes that can be performed and the one or more other configuration changes that are not capable of being performed;
in response to a determination that a third request requires that each of a set of two or more configuration changes be performed:
determining if each configuration change of the set of two or more configuration changes is capable of being performed, and
modifying the current operational state of the network device to reflect the configuration data only if each configuration change of the set of two or more configuration changes is capable of being performed.

17. The non-transitory machine-readable medium of claim 16, wherein the network device is a router.

18. The non-transitory machine-readable medium of claim 16, wherein modifying the current operational state further comprises:
storing the configuration data from the buffer to a device configuration database.

19. The non-transitory machine-readable medium of claim 18, wherein the configuration data stored in the device configuration database reflects only a set of configuration options that changed from a first operational state of the network device to a second operational state of the network device.

20. The non-transitory machine-readable medium of claim 18, wherein the device configuration database stores configuration history data that describes all changes in an operational state of the network device that occur over a period of time; and wherein execution of the one or more sequences of instructions by one or more processors further causes the one or more processors to perform the step of:
creating and providing a view of the configuration history data stored in the device configuration database associated with a particular point in time.

21. The non-transitory machine-readable medium of claim 20, wherein execution of the one or more sequences of instructions by one or more processors further causes the one or more processors to perform the step of:
generating, based on the configuration history data, a set of configuration changes that describe the change in configuration between two different operational states of the network device.

22. The non-transitory machine-readable medium of claim 16, wherein execution of the one or more sequences of instructions by one or more processors further causes the one or more processors to perform the step of:

creating and storing information identifying, for each of the two or more configuration changes, when the configuration change was made, what user initiated the configuration change, and a location from which the configuration change was initiated.

23. The non-transitory machine-readable medium of claim 16, wherein execution of the one or more sequences of instructions by one or more processors further causes the one or more processors to perform the step of:
prior to receiving the second request, creating and providing a view of the configuration data stored in the buffer.

24. The non-transitory machine-readable medium of claim 16, wherein the buffer is a particular buffer in a set of buffers, and wherein the step of storing the configuration data further comprises:
determining that the particular buffer in the set of buffers is associated with a particular user associated with the first request.

25. The non-transitory machine-readable medium of claim 16, wherein execution of the one or more sequences of instructions by one or more processors further causes the one or more processors to perform the steps of:
determining whether the first request contains one or more syntax errors; and
in response to a determination that the first request contains one or more syntax errors, informing a user associated with the first request that the first request contains one or more syntax errors.

26. The non-transitory machine-readable medium of claim 16, wherein execution of the one or more sequences of instructions by one or more processors further causes the one or more processors to perform the steps of:
determining whether the second request contains one or more semantic errors or one or more verification errors; and
in response to a determination that the first second contains one or more semantic errors or one or more verification errors, informing a user associated with the second request that the second request contains one or more semantic errors or one or more verification errors.

27. The non-transitory machine-readable medium of claim 16, wherein the first request is associated with a first user that holds an exclusive lock, wherein the exclusive lock indicates that only the holder of the exclusive lock may effect change to the current operational state of the network device, and wherein execution of the one or more sequences of instructions by one or more processors further causes the one or more processors to perform the steps of:
determining that a fourth request to change the configuration of the network device is associated with a second user who does not have the exclusive lock; and
notifying the second user that the fourth request is not performed.

28. The non-transitory machine-readable medium of claim 16, wherein execution of the one or more sequences of instructions by one or more processors further causes the one or more processors to perform the steps of:
receiving a fourth request to change the configuration of the network device from the current operational state of the network device to a prior operational state of the network device;
determining if a user associated with the fourth request has a sufficient privilege level for the third request to be performed; and
changing the configuration of the network device from the current operational state of the network device to the prior operational state of the network device upon determining that the user has the sufficient privilege level for the fourth request to be performed.

29. The non-transitory machine-readable medium of claim 16, wherein the first request and the second request are received using a command line interface (CLI).

30. The non-transitory machine-readable medium of claim 16, wherein the first request and the second request are received in an XML document.

31. An apparatus comprising a memory storing instructions which, when executed by the one or more processors, cause the one or more processors to perform the steps of:
receiving, at a network device, a first request for a change in configuration of a network device to a potential operational state from a current operational state of the network device, wherein the first request comprises configuration data that describes the change in configuration of the network device;
storing the configuration data from the first request in a buffer, wherein the change in configuration described by the configuration data includes two or more configuration changes;
after the storing, receiving, at the network device, a second request to modify the current operational state of the network device to reflect the configuration data stored in the buffer, wherein the second request specifies that the current operational state of the network device should be modified to reflect any of the two or more configuration changes that can be performed even when at least one of the two or more configuration changes cannot be performed;
obtaining an exclusive lock on the network device;
modifying the current operational state of the network device to reflect the configuration data only upon obtaining the exclusive lock by:
determining that the second request does not require at least one of the two or more configuration changes to be performed; and
in response to determining that the second request does not require at least one of the two or more configuration changes described by the configuration data to be performed: modifying the current operational state of the network device to reflect one or more configuration changes that can be performed, wherein one or more other configuration changes are not capable of being performed and are not performed, wherein the two or more configuration changes comprise one or more configuration changes that can be performed and the one or more other configuration changes that are not capable of being performed;
in response to a determination that a third request requires that each of a set of two or more configuration changes be performed:
determining if each configuration change of the set of two or more configuration changes is capable of being performed, and
modifying the current operational state of the network device to reflect the configuration data only if each configuration change of the set of two or more configuration changes is capable of being performed.

32. The apparatus of claim 31, wherein the network device is a router.

33. The apparatus of claim 31, wherein the step of modifying the current operational state further comprises:
storing the configuration data from the buffer to a device configuration database.

34. The apparatus of claim 33, wherein the configuration data stored in the device configuration database reflects only a set of configuration options that changed from a first operational state of the network device to a second operational state of the network device.

35. The apparatus of claim 33, wherein the device configuration database stores configuration history data that describes all changes in an operational state of the network device that occur over a period of time; and wherein the memory further comprises one or more additional instructions which, when executed by the one or more processors, cause the one or more processors to perform the step of:
   creating and providing a view of the configuration history data stored in the device configuration database associated with a particular point in time.

36. The apparatus of claim 35, wherein the memory further comprises one or more additional instructions which, when executed by the one or more processors, cause the one or more processors to perform the step of:
   generating, based on the configuration history data, a set of configuration changes that describe the change in configuration between two different operational states of the network device.

37. The apparatus of claim 31, wherein the memory further comprises one or more additional instructions which, when executed by the one or more processors, cause the one or more processors to perform the step of:
   creating and storing information identifying, for each of the two or more configuration changes, when the configuration change was made, what user initiated the configuration change, and a location from which the configuration change was initiated.

38. The apparatus of claim 31, wherein the memory further comprises one or more additional instructions which, when executed by the one or more processors, cause the one or more processors to perform the step of:
   prior to receiving the second request, creating and providing a view of the configuration data stored in the buffer.

39. The apparatus of claim 31, wherein the buffer is a particular buffer in a set of buffers, and wherein the step of storing the configuration data further comprises:
   determining that the particular buffer in the set of buffers is associated with a particular user associated with the first request.

40. The apparatus of claim 31, wherein the memory further comprises one or more additional instructions which, when executed by the one or more processors, cause the one or more processors to perform the steps of:
   determining whether the first request contains one or more syntax errors; and
   in response to a determination that the first request contains one or more syntax errors, informing a user associated with the first request that the first request contains one or more syntax errors.

41. The apparatus of claim 31, wherein the memory further comprises one or more additional instructions which, when executed by the one or more processors, cause the one or more processors to perform the steps of:
   determining whether the second request contains one or more semantic errors or one or more verification errors; and
   in response to a determination that the first second contains one or more semantic errors or one or more verification errors, informing a user associated with the second request that the second request contains one or more semantic errors or one or more verification errors.

42. The apparatus of claim 31, wherein the first request is associated with a first user that holds an exclusive lock, wherein the exclusive lock indicates that only the holder of the exclusive lock may effect change to the current operational state of the network device, and wherein the memory further comprises one or more additional instructions which, when executed by the one or more processors, cause the one or more processors to perform the steps of:
   determining that a fourth request to change the configuration of the network device is associated with a second user who does not have the exclusive lock; and
   notifying the second user that the fourth request is not performed.

43. The apparatus of claim 31, wherein the memory further comprises one or more additional instructions which, when executed by the one or more processors, cause the one or more processors to perform the steps of:
   receiving a fourth request to change the configuration of the network device from the current operational state of the network device to a prior operational state of the network device;
   determining if a user associated with the fourth request has a sufficient privilege level for the third request to be performed; and
   changing the configuration of the network device from the current operational state of the network device to the prior operational state of the network device upon determining that the user has the sufficient privilege level for the fourth request to be performed.

44. The apparatus of claim 31, wherein the first request and the second request are received using a command line interface (CLI).

45. The apparatus of claim 31, wherein the first request and the second request are received in an XML document.

* * * * *